& Seas, PLLC

United States Patent
Suzuki et al.

[11] Patent Number: 6,124,030
[45] Date of Patent: *Sep. 26, 2000

[54] CLEANING MEDIUM FOR MAGNETIC RECORDING DEVICES

[75] Inventors: Masaki Suzuki; Hiroo Inaba, both of Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,106

[22] Filed: Mar. 19, 1997

[30] Foreign Application Priority Data

Mar. 21, 1996 [JP] Japan ..................................... 8-064493

[51] Int. Cl.$^7$ .................................................... G11B 5/708
[52] U.S. Cl. .......................... 428/328; 428/329; 428/336; 428/694 BS; 428/900
[58] Field of Search ..................................... 510/167, 168; 360/128; 51/295, 297; 451/539; 428/328, 329, 336, 694 BS, 900

[56] References Cited

U.S. PATENT DOCUMENTS

| | | | |
|---|---|---|---|
| 4,516,176 | 5/1985 | Street | 360/75 |
| 4,652,958 | 3/1987 | Miyoshi et al. | 360/128 |
| 5,456,734 | 10/1995 | Ryoke et al. | 51/295 |
| 5,496,622 | 3/1996 | Isobe et al. | 428/328 |
| 5,604,015 | 2/1997 | Hayashi et al. | 428/336 |
| 5,611,826 | 3/1997 | Ryoke et al. | 51/295 |
| 5,612,122 | 3/1997 | Tsukamoto et al. | 428/336 |
| 5,637,390 | 6/1997 | Isobe et al. | 428/323 |
| 5,672,423 | 9/1997 | Inaba et al. | 428/323 |
| 5,698,286 | 12/1997 | Ikarashi et al. | 428/336 |

OTHER PUBLICATIONS

Mayuyama et al., Derwent abstract of Japanese patent 06 139531–A. 1994.

*Primary Examiner*—Steven A. Resan
*Attorney, Agent, or Firm*—Sughrue, Mion, Zinn, Macpeak & Seas, PLLC

[57] ABSTRACT

A cleaning medium for magnetic recording devices comprises a non-magnetic substrate, a lower coating layer, which is overlaid upon the non-magnetic substrate and primarily contains a binder and non-magnetic inorganic particles dispersed in the binder, and a cleaning layer, which is overlaid upon the lower coating layer and contains a binder and inorganic particles dispersed in the binder and at least containing ferromagnetic particles. An at least 50% by weight portion of the non-magnetic inorganic particles, which are contained in the lower coating layer, is constituted of granular inorganic particles, which have a mean particle diameter of at most 0.08 μm, or acicular inorganic particles, which have a mean longer axis length falling within the range of 0.05 μm to 0.3 μm and an acicular ratio falling within the range of 3 to 20. The cleaning medium removes dirt from magnetic heads with high cleaning power, such that the wear of the magnetic heads may be small and no scratch may occur on the cleaned magnetic heads.

8 Claims, No Drawings

CLEANING MEDIUM FOR MAGNETIC RECORDING DEVICES

BACKGROUND OF THE INVENTION

1. Field of the Invention

This invention relates to a cleaning medium for magnetic recording devices, such as a cleaning tape, for use in cleaning of magnetic heads or movement systems of magnetic recording and reproducing devices, such as those of audio, video, or computer equipments.

2. Description of the Prior Art

In general, with magnetic recording devices utilized in video, audio, or computer equipments, the recording or reproduction of magnetic information is carried out by moving a magnetic medium, such as a magnetic tape, while it is being in sliding contact with a magnetic head. At this time, if chips having been scraped out from the magnetic tape, dust contained in the ambient air around the device, or the like, clings to the surface of the magnetic head, the reproduction output will become low and, in the worst case, no output can be obtained. In such case, a cleaning medium, such as a cleaning tape, is utilized in order to remove dirt from the surface of the magnetic head and to thereby restore the desired level of the reproduction output.

Nowadays, there is a strong demand for the recording of magnetic information at high densities. In the cases of the recording of magnetic information at high densities, the problems often occur in that, if the state of contact between the end of the magnetic head and the magnetic tape is not kept good, the recording and the reproduction of magnetic information cannot be carried out satisfactory. Therefore, besides the removal of dirt from the magnetic head, it is necessary for the cleaning tape to have the functions for trueing up the shape of the magnetic head to a certain extent. In particular, recently, magnetic heads are utilized in magnetic recording and reproducing devices for carrying out the recording of magnetic information at high densities such that the shortest recording wavelength may be at most 1 $\mu$m. As for such magnetic heads, the gap length is at most 0.4 $\mu$m, and therefore even slight dirt on the magnetic heads will adversely affect the recording and reproducing performance.

Also, as the material of magnetic heads, ferrite having a high surface hardness was popular in the past. However, recently, in order to achieve the recording of magnetic information at high densities, metal heads, such as Sendust heads, are used widely. The metal heads are softer and suffer from more wear than the ferrite heads. Therefore, it is important that the amount of wear of the magnetic heads due to the cleaning tape be kept small.

As for the abrasive tape for use in the polishing of magnetic heads, an abrasive tape, which comprises a non-magnetic substrate, an intermediate layer containing non-magnetic particles, and an abrasive layer containing non-magnetic abrasive particles, the intermediate layer and the abrasive layer being overlaid in this order on the non-magnetic substrate, has been disclosed in, for example, Japanese Unexamined Patent Publication No. 62(1987)-92205. The disclosed abrasive tape employs the two-layer constitution, in which the surface of the intermediate layer is rendered rough, and in which the diameter of the abrasive particles contained in the abrasive layer overlaid upon the intermediate layer is set to be small, such that a desired level of polishing power may be obtained and the magnetic head may be prevented from being scratched. However, the disclosed abrasive tape is the one designed for the finishing polishing, and its surface roughness falls within the range of 0.03 $\mu$m to 0.3 $\mu$m. Therefore, the disclosed abrasive tape yields much wear of magnetic heads, is liable to cause scratches to occur on magnetic heads, and is therefore not suitable for use as a cleaning tape. Abrasive tapes for magnetic heads, which are similar to the abrasive tape disclosed in the aforesaid publication, are proposed in, for example, Japanese Unexamined Patent Publication Nos. 62(1987)-94270 and 62(1987)-92205. Each of the proposed abrasive tapes is provided with an abrasive layer constituted of two layers. However, the proposed abrasive tapes are not suitable for carrying out the cleaning with strong cleaning power such that the magnetic heads may not be scratched.

As for the cleaning tape for magnetic heads, a cleaning tape aiming at satisfying the two requirements with respect to good cleaning characteristics and little wear of magnetic heads has been disclosed in, for example, Japanese Unexamined Patent Publication No. 6(1994)-139531. The disclosed cleaning tape comprises a flexible substrate and two cleaning layers overlaid upon the flexible substrate, wherein the Young's modulus of the upper cleaning layer is set to be larger than the Young's modulus of the lower cleaning layer. However, the two cleaning layers of the disclosed cleaning tape contain ferromagnetic particles, and the disclosed cleaning tape cannot sufficiently satisfy the two requirements in that the cleaning tape should have strong cleaning characteristics as a whole and in that the cleaning tape should not cause scratches to occur on magnetic heads.

SUMMARY OF THE INVENTION

The primary object of the present invention is to provide a cleaning medium for magnetic recording devices for use in cleaning of magnetic heads or movement systems of high-density magnetic recording and reproducing devices, or the like, which cleaning medium yields little wear of magnetic heads, is capable of being used in cleaning metal heads, has good cleaning characteristics for removing dirt from magnetic heads with high cleaning power and restoring a desired level of reproduction output, and causes no scratches to occur on the cleaned magnetic heads.

The present invention provides a cleaning medium for magnetic recording devices, comprising:

i) a non-magnetic substrate, ii) a lower coating layer, which is overlaid upon the non-magnetic substrate and primarily contains a binder and non-magnetic inorganic particles dispersed in the binder, and iii) a cleaning layer, which is overlaid upon the lower coating layer and contains a binder and inorganic particles dispersed in the binder, the inorganic particles at least containing ferromagnetic particles, wherein an at least 50% by weight portion of the non-magnetic inorganic particles, which are contained in the lower coating layer, is constituted of granular inorganic particles (having granular shapes, that include a spherical shape and polyhedral shapes ranging from an approximately spherical shape to a cubic shape), which have a mean particle diameter of at most 0.08 $\mu$m, or acicular inorganic particles, which have a mean longer axis length falling within the range of 0.05 $\mu$m to 0.3 $\mu$m and an acicular ratio falling within the range of 3 to 20.

In the cleaning medium in accordance with the present invention, the non-magnetic inorganic particles, which are contained in the lower coating layer, should preferably be constituted of at least a single kind of particles selected from the group consisting of titanium oxide particles, α-iron oxide particles, barium sulfate particles, zinc oxide particles, and alumina particles.

Also, the lower coating layer and the cleaning layer should preferably be formed with a wet-on-wet coating technique, in which, after the lower coating layer has been coated on the substrate, the cleaning layer is coated on the lower coating layer while the lower coating layer is being in the wet state.

With the cleaning medium in accordance with the present invention, the lower coating layer, which primarily contains the binder and the non-magnetic inorganic particles dispersed in the binder, is overlaid upon the non-magnetic substrate. Also, the cleaning layer, which contains the binder and the inorganic particles dispersed in the binder, is overlaid upon the lower coating layer. The inorganic particles in the cleaning layer at least contain the ferromagnetic particles. An at least 50% by weight portion of the non-magnetic inorganic particles, which are contained in the lower coating layer, is constituted of the granular inorganic particles, which have a mean particle diameter of at most 0.08 μm, or the acicular inorganic particles, which have a mean longer axis length falling within the range of 0.05 μm to 0.3 μm and an acicular ratio falling within the range of 3 to 20. Therefore, in cases where the cleaning medium in accordance with the present invention is moved along a magnetic head in order to clean it while the cleaning layer of the cleaning medium is being in sliding contact with the surface of the magnetic head, the magnetic head can be cleaned strongly by the smooth surface of the cleaning layer. The cleaning medium in accordance with the present invention has a strong cleaning power and does not scratch the magnetic head.

In cases where the non-magnetic inorganic particles, which are contained in the lower coating layer, are constituted of the fine granular inorganic particles, which have a mean particle diameter of at most 0.08 μm, a smooth lower coating layer, which have good dispersion quality and an isotropic dynamic strength, can be obtained. In cases where the cleaning layer is coated onto the lower coating layer while the lower coating layer is being in the wet state, a smooth cleaning layer can be formed. As a result, the layer having a high strength in the vertical direction can be obtained. Accordingly, the smooth cleaning layer can quickly and appropriately clean the magnetic head such that the cleaned magnetic head may not be scratched.

In cases where the non-magnetic inorganic particles, which are contained in the lower coating layer, are constituted of the fine acicular inorganic particles, which have a small mean longer axis length falling within the range of 0.05 μm to 0.3 μm and a large acicular ratio falling within the range of 3 to 20, a lower coating layer, in which the acicular inorganic particles are well-ordered, can be obtained. Therefore, for example, in cases where the cleaning layer is coated onto the lower coating layer while the lower coating layer is being in the wet state, a smooth cleaning layer can be formed. As a result, the layer having a high strength in the longitudinal direction can be obtained. Accordingly, the smooth cleaning layer can quickly and appropriately clean the magnetic head such that the cleaned magnetic head may not be scratched.

DETAILED DESCRIPTION OF THE INVENTION

Basically, the cleaning medium in accordance with the present invention comprises a non-magnetic flexible substrate, a lower coating layer overlaid upon the non-magnetic flexible substrate, and a cleaning layer overlaid upon the lower coating layer. The lower coating layer primarily contains a binder and non-magnetic inorganic particles dispersed in the binder. The cleaning layer contains a binder and inorganic particles dispersed in the binder, the inorganic particles at least containing ferromagnetic particles.

An at least 50% by weight portion of the non-magnetic inorganic particles, which are contained in the lower coating layer, is constituted of the granular inorganic particles (having granular shapes, that include a spherical shape and polyhedral shapes ranging from an approximately spherical shape to a cubic shape), which have a mean particle diameter of at most 0.08 μm, or the acicular inorganic particles, which have a mean longer axis length falling within the range of 0.05 μm to 0.3 μm and an acicular ratio falling within the range of 3 to 20. The non-magnetic inorganic particles, which are contained in the lower coating layer, should preferably be constituted of at least a single kind of particles selected from the group consisting of titanium oxide particles, α-iron oxide particles, barium sulfate particles, zinc oxide particles, and alumina particles.

The thickness of the cleaning layer should preferably fall within the range of 0.05 μm to 1.0 μm. The surface of the cleaning layer is formed to be smooth, and its surface roughness Ra, expressed in terms of arithmetic mean deviation, should preferably fall within the range of 1.0 nm to 7.0 nm.

The cleaning layer is formed with a wet-on-wet coating technique (a simultaneous or sequential wet coating technique), in which, after the lower coating layer has been coated on the substrate, the cleaning layer is coated on the lower coating layer while the lower coating layer is being in the wet state. The thickness of the entire cleaning medium (cleaning tape) should preferably fall within the range of 4 μm to 15 μm. The thickness of the substrate should preferably fall within the range of 2 μm to 10 μm, and the thickness of the lower coating layer should preferably fall within the range of 0.2 μm to 5.0 μm.

As for the magnetic characteristics of the cleaning layer, the squareness ratio (remanent magnetic flux density Br/maximum magnetic flux density Bm) in the magnetization curve, as measured under an external magnetic field of 10 kOe, falls within the range of 0.6 to 0.98, and the coercive force Hc falls within the range of 500 Oe to 3,000 Oe. The surface roughness Ra, expressed in terms of arithmetic mean deviation, of the surface of the substrate should preferably fall within the range of 0.5 nm to 7.0 nm.

The lower coating layer will hereinbelow be described in detail.

The inorganic particles employed in the lower coating layer are the non-magnetic particles and may be constituted of inorganic compounds selected from the group consisting of metal oxides, metal carbonates, metal sulfates, metal nitrides, metal carbides, and metal sulfides. An at least 50% by weight portion of the non-magnetic inorganic particles, which are contained in the lower coating layer, is constituted of the aforesaid granular inorganic particles or the aforesaid acicular inorganic particles.

Examples of the inorganic compounds include α-alumina having a degree of alphatization of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. The above-enumerated inorganic compounds may be used alone, or two or more of them may be used in combination. From the point of view of the commercial availability, the cost, the narrow distribution of the particle size, and the availability of various function imparting means, titanium dioxide, zinc oxide, iron oxide, and barium sulfate are preferable. Titanium dioxide and α-iron oxide are more preferable.

The non-magnetic inorganic particles may have an acicular shape or granular shapes (that include a spherical shape and polyhedral shapes ranging from an approximately spherical shape to a cubic shape). In cases where the granular non-magnetic inorganic particles are employed, the particles having a mean particle diameter of at most 0.08 μm should preferably be contained in proportions of at least 50% by weight with respect to the total amount of the non-magnetic inorganic particles. In cases where the acicular non-magnetic inorganic particles are employed, the particles having a mean longer axis length falling within the range of 0.05 μm to 0.3 μm and an acicular ratio falling within the range of 3 to 20 should preferably be contained in proportions of at least 50% by weight with respect to the total amount of the non-magnetic inorganic particles.

The tap density of the non-magnetic inorganic particles may fall within the range of 0.05 g/ml to 2 g/ml, and should preferably fall within the range of 0.2 g/ml to 1.5 g/ml. The water content of the non-magnetic inorganic particles may fall within the range of 0.1% by weight to 5% by weight, should preferably fall within the range of 0.2% by weight to 3% by weight, and should more preferably fall within the range of 0.3% by weight to 1.5% by weight. The pH value of the non-magnetic inorganic particles may fall within the range of 2 to 11, and should preferably fall within the range of 5 to 10. The specific surface area of the non-magnetic inorganic particles may fall within the range of 1 $m^2/g$ to 100 $m^2/g$, should preferably fall within the range of 5 $m^2/g$ to 70 $m^2/g$, and should more preferably fall within the range of 10 $m^2/g$ to 65 $m^2/g$. The crystallite size of the non-magnetic inorganic particles should preferably fall within the range of 0.004 μm to 0.3 μm, and should more preferably fall within the range of 0.04 μm to 0.08 μm. The oil absorption amount, as measured with dibutyl phthalate (DBP), of the non-magnetic inorganic particles may fall within the range of 5 ml/100 g to 100 ml/100 g, should preferably fall within the range of 10 ml/100 g to 80 ml/100 g, and should more preferably fall within the range of 20 ml/100 g to 60 ml/100 g. The specific gravity of the non-magnetic inorganic particles may fall within the range of 1 to 12, and should preferably fall within the range of 3 to 6.

The ignition loss of the non-magnetic inorganic particles should preferably be at most 20% by weight, and should more preferably be zero. The Mohs hardness of the non-magnetic inorganic particles should preferably fall within the range of 4 to 10. The roughness factor of the surface of the non-magnetic inorganic particles should preferably fall within the range of 0.8 to 1.5, and should more preferably fall within the range of 0.9 to 1.2. The stearic acid (SA) adsorption amount of the non-magnetic inorganicparticles should preferably fall within the range of 1 $\mu mol/m^2$ to 20 $mol/m^2$, and should more preferably fall within the range of 2 $\mu mol/m^2$ to 15 $\mu mol/m^2$. The heat of wetting of the non-magnetic inorganic particles with water at 25° C. should preferably fall within the range of 200 $erg/cm^2$ to 600 $erg/cm^2$. Solvents yielding the heat of wetting falling within this range may be utilized. The number of water molecules on the particle surface at a temperature of 100° C. to 400° C. should preferably fall within the range of 1 to 10 molecules/100 A. The pH value at the isoelectric point in water should preferably fall within the range of 3 to 6.

The surfaces of the non-magnetic inorganic particles should preferably be treated with a surface treating agent selected from the group consisting of $Al_2O_3$, $SiO_2$, $TiO_2$, $ZrO_2$, $SnO_2$, $Sb_2O_3$, ZnO, and $Y_2O_3$. From the point of view of the dispersibility, $Al_2O_3$, $SiO_2$, $TiO_2$, and $ZrO_2$ are preferable, among which $Al_2O_3$, $SiO_2$, and $ZrO_2$ are more preferable. The above-enumerated surface treating agents may be used alone, or two or more of them may be used in combination. Also, a co-precipitated surface treatment layer may be employed in accordance with the characteristics of the non-magnetic inorganic particles which are to be obtained. Alternatively, the particle surfaces may firstly be treated with alumina, and thereafter the surface layers may be treated with silica. As another alternative, the particle surfaces may firstly be treated with silica, and thereafter the surface layers may be treated with alumina. Further, the surface treatment layer may be set to be porous in accordance with the characteristics of the non-magnetic inorganic particles which are to be obtained. However, ordinarily, the surface treatment layer should preferably be homogeneous and dense.

Examples of the non-magnetic inorganic particles employed in the lower coating layer of the cleaning medium in accordance with the present invention include Nanotite supplied by Showa Denko K.K.; HIT-100 and ZA-G1, which are supplied by Sumitomo Chemical Co., Ltd.; α Hematite, DPN-250, DPN-250BX, DPN-245, DPN-270BX, and DPN-550BX, which are supplied by Toda Kogyo K.K.; Titanium Oxide TTO-51B, TTO-55A, TTO-55B, TTO-55C, TTO-55S, TTO-55D, SN-100, α Hematite E270, E271, and E300, which are supplied by Ishihara Sangyo Kaisha, Ltd.; STT-4D, STT-30D, STT-30, and STT-65C, which are supplied by Titan Kogyo K.K.; MT-100S, MT-100T, MT-150W, MT-500B, MT-600B, MT-100F, and MT-500HD, which are supplied by Teika Co.; FINEX-25, BF-1, BF-10, BF-20, and ST-M, which are supplied by Sakai Chemical Industry Corp.; DEFIC-Y and DEFIC-R, which are supplied by Dowa Mining Co., Ltd.; AS2BM and TiO2P25, which are supplied by Nippon Aerosil Corp.; 100A and 500A, which are supplied by Ube Industries, Ltd.; Y-LOP supplied by Titan Kogyo K.K.; and products obtained by firing the above-enumerated non-magnetic inorganic particles.

Among the above-enumerated non-magnetic inorganic particles, α-iron oxide and titanium dioxide are particularly preferable. As the α-iron oxide (hematite), the particles obtained under the conditions described below may be used. Specifically, acicular goethite particles serving as the precursor of the $\alpha$-$Fe_2O_3$ particles are obtained with one of the methods described below. In a first method, at least an equivalent amount of an aqueous alkali hydroxide solution is added to an aqueous ferrous iron solution, and a suspension containing ferrous hydroxide colloid is thereby obtained. Thereafter, the pH value of the suspension is set to be at least 11, and an oxygen-containing gas is introduced into the suspension at a temperature of at most 80° C. The oxidation reaction is thus carried out, and the acicular goethite particles are thereby obtained. In a second method, an aqueous ferrous salt solution and an aqueous alkali carbonate solution are reacted with each other, and a suspension containing $FeCO_3$ is thereby obtained. Thereafter, an oxygen-containing gas is introduced into the suspension. The oxidation reaction is thus carried out, and spindle-shaped goethite particles are thereby obtained. In a third method, an amount of an aqueous alkali hydroxide solution or an aqueous alkali carbonate solution, which amount is less than the equivalent amount, is added to an aqueous ferrous salt solution, and an aqueous ferrous salt solution containing ferrous hydroxide colloid is thereby obtained. An oxygen-containing gas is then introduced into the aqueous ferrous salt solution, which contains the ferrous hydroxide colloid. The oxidation reaction is thus carried out, and acicular goethite nuclear particles are thereby formed. Thereafter, an amount of an aqueous alkali hydroxide solution, which amount is at least equivalent with respect to $Fe^{2+}$ contained in the aqueous ferrous salt solution containing the acicular goethite nuclear particles, is added to the aqueous ferrous salt solution containing the acicular goethite nuclear particles. An oxygen-containing gas is then introduced into the resulting mixture, and the acicular goethite nuclear particles are thereby grown. In a fourth method, an amount of an aqueous alkali hydroxide solution or an aqueous alkali carbonate solution, which amount is less than the equivalent amount, is added to an aqueous ferrous iron solution, and an aqueous ferrous salt solution containing ferrous hydroxide colloid is thereby obtained. An oxygen-containing gas is then introduced into the aqueous ferrous salt solution, which contains the ferrous hydroxide colloid. The oxidation reaction is thus carried out, and acicular goethite nuclear particles are thereby formed. Thereafter, the acicular goethite nuclear particles are grown under acidic to neutral conditions. During the reaction for forming the goethite particles, different elements, such as Ni, Zn, P, and Si, which are ordinarily employed in order to improve the characteristics of the particles, may be added to the reaction mixture.

Thereafter, the acicular goethite particles, which serve as the precursor particles, are dehydrated at a temperature falling within the range of 200° C. to 500° C. When necessary, the goethite particles may then be annealed with heat treatment at a temperature falling within the range of 350° C. to 800° C. In this manner, the acicular $\alpha$-$Fe_2O_3$ particles are obtained. The anti-sintering agents, such as P, Si, B, Zr, and Sb, may be adhered to the surfaces of the acicular goethite particles, which are subjected to the dehydration or the annealing. As described above, the annealing may be carried out with heat treatment at a temperature falling within the range of 350° C. to 800° C. Specifically, with the annealing, the pole surfaces of the acicular $\alpha$-$Fe_2O_3$ particles having been obtained from the dehydration can be fused, and pores having occurred on the particle surfaces can thereby be closed. As a result, the particles having smooth surfaces can be obtained.

The acicular $\alpha$-$Fe_2O_3$ particles having been obtained from the dehydration or the annealing are then dispersed in an aqueous solution, and a suspension is thereby obtained. An Al compound is added to the suspension, and the pH value of the suspension is adjusted. The surfaces of the $\alpha$-$Fe_2O_3$ particles are thereby covered with the Al compound. Thereafter, filtration, washing with water, drying, and grinding are carried out. Also, when necessary, deaeration, consolidation treatment, or the like, may be carried out. In this manner, the $\alpha$-$Fe_2O_3$ particles, which may be employed in the present invention, can be obtained. As the Al compound, it is possible to employ an aluminum salt, such as aluminum acetate, aluminum sulfate, aluminum chloride, or aluminum nitrate; or an alkali aluminate, such as sodium aluminate. The proportion of the Al compound, as calculated in terms of Al, may fall within the range of 0.01% by weight to 50% by weight with respect to the $\alpha$-$Fe_2O_3$ particles. If the proportion of the Al compound, as calculated in terms of Al, is less than 0.01% by weight with respect to the $\alpha$-$Fe_2O_3$ particles, dispersion in the binder resin cannot be carried out sufficiently. If the proportion of the Al compound, as calculated in terms of Al, is more than 50% by weight with respect to the $\alpha$-$Fe_2O_3$ particles, adverse effects will occur from the interaction between the portions of the Al compound floating on the particle surfaces.

The non-magnetic inorganic particles, which are contained in the lower coating layer of the cleaning medium in accordance with the present invention, may be covered with the Al compound together with at least a single kind of compound selected from the group consisting of Si compounds, P compounds, Ti compounds, Mn compounds, Ni compounds, Zn compounds, Zr compounds, Sn compounds, and Sb compounds. The proportion of each of the compounds, which may be employed together with the Al compound, may fall within the range of 0.01% by weight 50% by weight with respect to the $\alpha$-$Fe_2O_3$ particles. If the proportion of each of the compounds, which may be employed together with the Al compound, is less than 0.01% by weight with respect to the $\alpha$-$Fe_2O_3$ particles, the effects for improving the dispersibility by the addition of the compound cannot be obtained sufficiently. If the proportion of each of the compounds, which may be employed together with the Al compound, is more than 50% by weight with respect to the $\alpha$-$Fe_2O_3$ particles, adverse effects will occur from the interaction between the portions of the compound floating in the region other than the particle surfaces.

Titanium dioxide, which may be employed as the non-magnetic inorganic particles in the lower coating layer, may be produced in the manner described below. Specifically, titanium dioxide may be produced with a sulfuric acid process or a chlorine process. With the sulfuric acid process, an ilmenite raw ore is digested with sulfuric acid, and Ti, Fe, and the like, are extracted as sulfates. Iron sulfate is then separated by crystallization and removed. The remaining titanyl sulfate solution is purified by filtration and subjected to thermo-hydrolysis. Hydrous titanium oxide is thereby precipitated. The hydrous titanium oxide collected by filtration and washed, and impurities are removed therefrom by washing. A particle diameter regulating agent, or the like, is then added to the hydrous titanium oxide, and the resulting mixture is fired at a temperature falling within the range of 80° C. to 1,000° C. Crude titanium oxide is thereby obtained. The rutile-type titanium oxide or the anatase-type titanium oxide is obtained, depending upon the kind of the nucleating agent, which is added at the time of the hydrolysis. The crude titanium oxide is subjected to grinding, dressing of particles, surface treatment, and the like, and the desired titanium oxide is thereby obtained. With the chlorine process, natural rutile or synthetic rutile is employed as the raw ore. The ore is chlorinated under high-temperature reducing conditions. By the chlorination, Ti is converted into $TiCl_4$, and Fe is converted into $FeCl_2$. Iron oxide having been solidified by cooling is separated from $TiCl_4$. The thus obtained crude $TiCl_4$ is purified by rectification, and a nucleating agent is then added to the purified $TiCl_4$. Thereafter, $TiCl_4$ is instantaneously reacted with oxygen at a temperature of at least 1,000° C., and crude titanium oxide is thereby obtained. The finishing method for imparting the pigment-like properties to the crude titanium oxide having been formed in the oxidation and decomposition step is the same as that employed in the sulfuric acid process.

Surface treatment is carried out in the manner described below. Specifically, after the aforesaid titanium oxide material is ground under dry conditions, water and dispersing agent are added to the titanium oxide material, and the resulting mixture is subjected to wet grinding and centrifugal separation. Coarse particles are thereby classified. Thereafter, the fine particle slurry is introduced into a surface treatment tank, and the surfaces of the particles are covered with a metal hydroxide. Firstly, a predetermined amount of an aqueous solution of a salt of Al, Si, Ti, Zr, Sb, Sn, Zn, or the like, is added to the fine particle slurry, and an acid or an alkali for neutralization is added. The surfaces of the titanium oxide particles are thereby covered with the thus formed hydrous oxide. Water-soluble salts formed as by-products are removed by decantation, filtration, and washing. The pH value of the slurry is adjusted, the slurry is then filtrated, and washed with deionized water. Thereafter, the washed cake is dried with a spray dryer or a band dryer. The dried material is then ground with a jet mill, and the final product is thereby obtained. Instead of surface treatment being carried out in the water-based system, vapor of $AlCl_3$ or $SiCl_4$ may be passed over the titanium oxide particles, steam may then be introduced, and the gain surfaces may thereby be treated with Al or Si. As for the other pigment producing techniques, reference may be made to "Characterization of Powder Surfaces" by G. D. Parfitt and K. S. W. Sing, Academic Press, 1976.

The non-magnetic inorganic particles described above may also contain carbon black. The binder, in which the non-magnetic inorganic particles are to be dispersed, will be described later.

In cases where carbon black is contained in the lower coating layer, as is already known, the antistatic effects can be obtained by reducing the electrical surface resistance Rs, and the light transmittance can be kept small. Also, a desired micro Vickers hardness can be obtained. The micro Vickers hardness may ordinarily fall within the range of 25 kg/mm² to 60 kg/mm². Such that the state of contact with a magnetic head may be adjusted, the micro Vickers hardness should preferably fall within the range of 30 kg/mm² to 50 kg/mm². The micro Vickers hardness is measured with a thin film hardness tester HMA-400 supplied by NEC Co., Ltd. by using a diamond stylus having a triangular pyramid shape, which has a dihedral angle of 80 degrees and an end radius of 0.1 µm, at the end of the penetrator.

As the carbon black, furnace black for rubber, thermal black for rubber, coloring black, acetylene black, or the like, may be used. The specific surface area of the carbon black may fall within the range of 100 m²/g to 500 m²/g, and should preferably fall within the range of 150 m²/g to 400 m²/g. The dibutyl phthalate (DBP) oil absorption of the carbon black may fall within the range of 20 ml/100 g to 400 ml/100 g, and should preferably fall within the range of 30 ml/100 g to 200 ml/100 g. The primary particle diameter of the carbon black may fall within the range of 10 nm to 80 nm, should preferably fall within the range of 10 nm to 50 nm, and should more preferably fall within the range of 10 nm to 40 nm. The carbon black should preferably have a pH value falling within the range of 2 to 10, a water content falling within the range of 0.1% to 10%, and a tap density falling within the range of 0.1 g/ml to 1 g/ml.

Examples of the carbon black capable of being used in the lower coating layer of the cleaning medium in accordance with the present invention include Blackpearls 2000, 1300, 1000, 900, 800, 880, 700, and Vulcan XC-72, which are supplied by Cabot Co.; #3050B, 3150B, 3250B, #3750B, #3950B, #950, #650B, #970B, #850B, MA-600, MA-230, #4000, and #4010, which are supplied by Mitsubishi Chemical Industries Ltd.; Conductex SC, Raven 8800, 8000, 7000, 5750, 5250, 3500, 2100, 2000, 1800, 1500, 1255, and 1250, which are supplied by Columbian Carbon Co.; and Ketjen Black EC supplied by Ketjen Black International Company. The carbon black may be subjected to surface treatment with a dispersing agent, or the like, or maybe grafted with a resin. It is also possible to employ a carbon black having been treated such that a portion of the carbon black surface may be graphitized. Further, before being added to a coating material, the carbon black may be dispersed in a binder.

The proportion of the carbon black may fall within the range of 5% by weight to 49% by weight with respect to the non-magnetic inorganic particles described above and may be at most 40% with respect to the total weight of the non-magnetic layer. The carbon black materials described above may be used alone, or two or more of them may be used in combination. As for the carbon black which may be employed in the cleaning medium in accordance with the present invention, reference may be made to, for example, "Carbon Black Handbook," published by Carbon Black Society.

Also, organic particles may be added to the lower coating layer in accordance with the characteristics of the lower coating layer which is to be obtained. Examples of the materials of the organic particles include an acryl styrene resin, a benzoguanamine resin, a melamine resin, and a phthalocyanine pigment. It is also possible to employ particles of a polyolefin resin, a polyester resin, a polyamide resin, a polyimide resin, or a polyfluoroethylene resin. The above-enumerated organic particles may be produced with one of methods described in, for example, Japanese Unexamined Patent Publication Nos. 60(1985)-255827 and 62(1987)-18564.

As for the binders, lubricating agents, dispersing agents, additives, solvents, dispersing methods, and other techniques, which may be employed for the lower coating layer, those ordinarily utilized for magnetic layers may be utilized. In particular, as for the proportions and kinds of the binders, additives, and dispersing agents, the techniques already known for magnetic layers may be employed.

The cleaning layer, which is overlaid upon the lower coating layer, will hereinbelow be described in detail.

The inorganic particles, which are employed in the cleaning layer, contain the ferromagnetic particles. As the ferromagnetic particles, it is possible to employ any of already known ferromagnetic particles, such as the particles of $\gamma$-$FeO_x$ (where x=1.33 to 1.5), Co-modified $\gamma$-$FeO_x$ (where x=1.33 to 1.5), a ferromagnetic alloy containing $\alpha$-Fe, Ni, or Co as the main constituent (in proportions of at least 75%), barium ferrite, or strontium ferrite. Among the above-enumerated ferromagnetic particles, the particles of the ferromagnetic alloy containing $\alpha$-Fe as the main constituent are preferable. Besides the predetermined atoms, the ferromagnetic particles may also contain Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and Mg atoms. Particularly, in the cases of metal magnetic materials, Al, Si, Ca, Y, Ba, La, Nd, Co, Ni, and B are important as the elements contained besides $\alpha$-Fe. Among the above-enumerated elements, Si, Al, and Y are important as the surface treatment agents and the anti-sintering agents. The proportion of Co should preferably fall within the range of 2% by weight to 40% by weight with respect to Fe. The proportion of each of Si, Al, and Y may fall within the range of 0 to 10% by weight. Before being subjected to the dispersing step, the ferromagnetic particles maybe treated with dispersing agents, lubricating agents, surface-active agents, antistatic agents, or the like, which will be described later. Specifically, various ferromagnetic particles are described in, for example, Japanese Patent Publication Nos. 44(1969)-14090, 45(1970)-18372, 47(1972)-22062, 47(1972)-22513, 46(1971)-28466, 46(1971)-38755, 47(1972)-4286, 47(1972)-12422, 47(1972)-17284, 47(1972)-18509, 47(1972)-18573, 39(1964)-10307, 48(1973)-39639, and U.S. Pat. Nos. 3,026,215, 3,031,341, 3,100,194, 3,242,005, and 3,389,014.

Among the above-enumerated ferromagnetic particles, the ferromagnetic alloy particles may contain small amounts of hydroxides or oxides. The ferromagnetic alloy particles produced in accordance with any of conventional producing techniques may be employed. Examples of the conventional techniques for producing the ferromagnetic alloy particles include the following:

(a) A technique for reducing a composite organic acid salt (mainly, oxalic acid salt) with a reducing gas, such as hydrogen gas.

(b) A technique for reducing iron oxide with a reducing gas, such as hydrogen gas, and thereby obtaining Fe particles or Fe—Co particles.

(c) A technique for thermally decomposing a metal carbonyl compound.

(d) A technique for adding a reducing agent, such as sodium boron hydride, hypophosphite, or hydrazine, to an aqueous solution of a salt of a ferromagnetic metal, and reducing the salt of the ferromagnetic metal.

(e) A technique for evaporating a metal in an inert gas at a low pressure, and thereby obtaining fine metal particles.

The ferromagnetic alloy particles having been obtained in the manner described above may be subjected to known gradual oxidation treatment. Specifically, the ferromagnetic alloy particles may be dipped in an organic solvent and then dried. Alternatively, the ferromagnetic alloy particles may be dipped in an organic solvent, an oxygen-containing gas may then be passed over the particles, oxide films may thereby be formed on the particle surfaces, and the particles may then be dried. As another alternative, instead of an organic solvent being used, oxide films may be formed on the particle surfaces by adjusting the partial pressures of an oxygen gas and an inert gas.

The specific surface area, as measured with the BET method, of the ferromagnetic particles, which are contained in the cleaning layer of the cleaning medium in accordance with the present invention, may fall within the range of 45 $m^2/g$ to 80 $m^2/g$, and should preferably fall within the range of 50 $m^2/g$ to 70 $m^2/g$. If the specific surface area of the ferromagnetic particles is less than 40 $m^2/g$ or is more than 80 $m^2/g$, good surface smoothness cannot be obtained. The crystallite size of the ferromagnetic particles, which are contained in the cleaning layer, may fall within the range of 100 A to 300 A, should preferably fall within the range of 100 A to 250 A, and should more preferably fall within the range of 140 A to 200 A.

The value of saturation magnetization $\sigma S$ of the ferromagnetic particles should preferably fall within the range of 100 emu/g to 180 emu/g, should more preferably fall within the range of 110 emu/g to 170 emu/g, and should most preferably fall within the range of 125 emu/g to 160 emu/g. The coercive force Hc of the ferromagnetic particles should preferably fall within the range of 500 Oe to 3,000 Oe. The squareness ratio should preferably fall within the range of 0.6 to 0.98. The amount of magnetization of the cleaning layer should preferably fall within the range of 0.03 to 0.3 gauss·cm. The acicular ratio of the ferromagnetic particles should preferably fall within the range of 4 to 18, and should more preferably fall within the range of 5 to 12. The water content of the ferromagnetic particles should preferably fall within the range of 0.01% to 2%. The water content of the ferromagnetic particles should preferably be adjusted appropriately in accordance with the kind of the binder used.

The pH value of the ferromagnetic particles should preferably adjusted appropriately in accordance with the combination with the binder used. The pH value of the ferromagnetic particles may fall within the range of 4 to 12, and should preferably fall within the range of 6 to 10. When necessary, the ferromagnetic particles may be subjected to surface treatment using a surface treatment agent, such as Al, Si, P, or one of oxides of them. The proportion of the surface treatment agent may fall within the range of 0.1% to 10%. In cases where surface treatment is carried out, the rate of adsorption of a lubricating agent, such as a fatty acid, can be kept to be at most 100 $mg/m^2$. It often occurs that the ferromagnetic particles contain a soluble inorganic ion, such as Na, Ca, Fe, Ni, or Sr. The content of such a soluble inorganic ion should preferably be substantially zero. However, in cases where the content of the soluble inorganic ion is at most 200 ppm, adverse effects will not particularly occur on the characteristics of the ferromagnetic particles. The amount of pores of the ferromagnetic particles should preferably be as small as possible. Specifically, the amount of pores of the ferromagnetic particles should preferably be at most 20% by volume, and should preferably be at most 5% by volume.

As the binders contained in the cleaning layer and the lower coating layer of the cleaning medium in accordance with the present invention, thermoplastic resins, thermosetting resins, or reactive resins, which are already known, or mixtures of two or more of these resins may be used. The thermoplastic resins may have a glass transition temperature falling within the range of approximately −100° C. to approximately 150° C., a number-average molecular weight falling within the range of approximately 1,000 to approximately 200,000, preferably approximately 10,000 to approximately 100,000, and a polymerization degree falling within the range of approximately 50 to approximately 1,000.

Examples of the thermoplastic resins include polymers or copolymers containing, as the constituent unit, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, or a vinyl ether. Examples of the thermoplastic resins also include polyurethane resins and various kinds of rubber-type resins. Examples of the thermosetting resins or the reactive resins include a phenol resin, an epoxy resin, a polyurethane curable resin, a urea resin, a melamine resin, an alkyd resin, an acrylic reactive resin, formaldehyde resin, a silicone resin, an epoxy-polyamide resin, a mixture of a polyester resin and an isocyanate prepolymer, a mixture of a polyester polyol and a polyisocyanate, and a mixture of a polyurethane and a polyisocyanate. The above-enumerated resins are described in detail in, for example, "Plastic Handbook" published by Asakura Shoten. It is also possible to use a known electron beam-curing resin in the lower coating layer or the cleaning layer.

Examples of the aforesaid resins and methods for producing them are described in detail in, for example, Japanese Unexamined Patent Publication No. 62(1987)-256219. The above-enumerated resins may be used alone, or two or more of them may be used in combination. Examples of preferable binders include a combination of a polyurethane resin and at least a single kind of resin selected from the group consisting of a vinyl chloride resin, a vinyl chloride-vinyl acetate resin, a vinyl chloride-vinyl acetate-vinyl alcohol resin, and a vinyl chloride-vinyl acetate-maleic anhydride copolymer; and a mixture of such a combination and a polyisocyanate.

As for the structures of the polyurethane resins, it is possible to employ any of known structures, such as a polyester polyurethane, a polyether polyurethane, a polyether polyester polyurethane, a polycarbonate polyurethane, a polyester polycarbonate polyurethane, a polycaprolactone polyurethane, and a polyolefin polyurethane. When necessary, such that good dispersion properties and good durability may be obtained, at least a single kind of polar group may be introduced into the above-enumerated binders through a copolymerization reaction or an addition reaction. The polar group may be selected from the group consisting of —COOM, —SO$_3$M, —OSO$_3$M, —P=O(OM)$_2$, —O—P=O(OM)$_2$, wherein M represents a hydrogen atom or an alkali metal salt group, —OH, —NR$_2$, —N$^+$R$_3$, wherein R represents a hydrocarbon group, an epoxy group, —SH, —CN, sulfobetaine, phosphobetaine, and carboxybetaine. The proportion of the polar group may fall within the range of $10^{-1}$ to $10^{-8}$ mol/g, and should preferably fall within the range of $10^{-2}$ to $10^{-6}$ mol/g.

Specifically, examples of the aforesaid binders which may be employed in the cleaning medium in accordance with the present invention include VAGH, VYHH, VMCH, VAGF, VAGD, VROH, VYES, VYNC, VMCC, XYHL, XYSG, PKHH, PKHJ, PKHC, and PKFE, which are supplied by Union Carbide Co.; MPR-TA, MPR-TA5, MPR-TAL, MPR-TSN, MPR-TMF, MPR-TS, MPR-TM, and MPR-TAO, which are supplied by Nisshin Kagaku Kogyo K.K.; 1000W, DX80, DX81, DX82, DX83, and 100FD, which are supplied by Denki Kagaku Kogyo K.K.; MR-104, MR-105, MR110, MR100, and 400X-110A, which are supplied by Nippon Zeon Co., Ltd.; Nipporan N2301, N2302, and N2304, which are supplied by Nippon Polyurethane K.K.; Pandex T-5105, T-R3080, T-5201, Burnock D-400, D-210-80, Crisvon 6109, and 7209, which are supplied by Dainippon Ink and Chemicals, Inc.; Vylon UR8200, UR8300, and UR8600, which are supplied by Toyobo Co., Ltd.; Daiphelamin 402, 5020, 5100, 5300, 9020, 9022, and 7020, which are supplied by Dainichi Seika Kogyo K.K.; MX5004 supplied by Mitsubishi Kagaku K.K.; Sanprene SP-150, TIM-3003, and TIM-3005, which are supplied by Sanyo Chemical Industries Ltd.; and Saran F310, and F210, which are supplied by Asahi Chemical Industry Co., Ltd. Among the above-enumerated binders, MR-104, MR110, MPR-TAO, MPR-TA, UR8200, UR8300, and TIM-3005 are preferable.

Proportion of the binder in the cleaning layer may fall within the range of 5% by weight to 24% by weight with respect to the inorganic particles containing the ferromagnetic particles, and should preferably fall within the range of 8% by weight to 22% by weight with respect to the inorganic particles containing the ferromagnetic particles. In cases where a vinyl chloride resin is employed, its proportion may fall within the range of 5% by weight to 30% by weight. In cases where a polyurethane resin is employed, its proportion may fall within the range of 2% by weight to 20% by weight. The proportion of a polyisocyanate may fall within the range of 2% by weight to 20% by weight. A vinyl chloride resin, a polyurethane, and a polyisocyanate should preferably be used in combination. In particular, the layer constitution should preferably be set such that the cleaning layer may not contain a polyisocyanate, and the lower coating layer may contain a polyisocyanate.

In cases where a polyurethane is employed, the polyurethane should preferably have a glass transition temperature falling within the range of −50° C. to 100° C., a breaking extension falling within the range of 100% to 2,000%, a breaking stress falling within the range of 0.05 kg/cm to 10 kg/cm, and a yield point falling within the range of 0.05 kg/cm$^2$ to 10 kg/cm$^2$.

The cleaning medium in accordance with the present invention comprises at least two layers. Therefore, when necessary, the amount of the binder, the proportion of a vinyl chloride resin, a polyurethane, a polyisocyanate, or the like, in the binder, the molecular weight of each resin, the proportion of a polar group, physical characteristics of each resin, or the like, may be varied between the lower coating layer and the cleaning layer. As for such techniques, any of already known techniques may be employed.

Examples of the polyisocyanates include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use the products of reactions of the above-enumerated isocyanates and polyalcohols, and polyisocyanates produced from condensation of isocyanates. Such polyisocyanates are commercially available under the trade names of, for example, Coronate L, Coronate HL, Coronate 2030, Coronate 2031, Myrionate MR, and Myrionate MTL, which are supplied by Nippon Polyurethane K.K.; Takenate D-102, Takenate D-11ON, Takenate D-200, and Takenate D-202, which are supplied by Takeda Chemical Industries, Ltd.; Desmodur L, Desmodur IL, Desmodur N, and Desmodur HL, which are supplied by Sumitomo Bayer K.K.); and Burnock D502, which is supplied by Dainippon Ink and Chemicals, Inc. In each of the lower coating layer and the cleaning layer, these polyisocyanates may be used alone, or a mixture of two or more of them may be used by the utilization of differences in curing reaction properties.

As in the lower coating layer, the cleaning layer may contain carbon black as the inorganic particles. As the carbon black, furnace black for rubber, thermal black for rubber, coloring black, acetylene black, or the like, may be used. The specific surface area of the carbon black may fall within the range of 5 m$^2$/g to 500 m$^2$/g, and the dibutyl phthalate (DBP) oil absorption of the carbon black may fall within the range of 10 ml/100 g to 400 ml/100 g. The particle diameter of the carbon black may fall within the range of 5 mμ to 300 mμ, and the pH value of the carbon black may fall within the range of 2 to 10. The water content of the carbon black may fall within the range of 0.1% to 10%, and the tap density of the carbon black may fall within the range of 0.1 g/cc to 1 g/cc. Examples of the carbon black capable of being used in the cleaning layer of the cleaning medium in accordance with the present invention include Blackpearls 2000, 1300, 1000, 900, 800, 700, and Vulcan XC-72, which are supplied by Cabot Co.; #80, #60, #55, #50, and #35, which are supplied by Asahi Carbon K.K.; #2400B, #2300, #5, #900, #950, #970, #1000, #30, #40, and #10B, which are supplied by Mitsubishi Chemical Industries Ltd.; Conductex SC, Raven 150, 50, 40, and 15, which are supplied by Columbian Carbon Co. The carbon black maybe subjected to surface treatment with a dispersing agent, or the like, or may be grafted with a resin. It is also possible to employ a carbon black having been treated such that a portion of the carbon black surface may be graphitized. Further, before being added to a coating material for the formation of the cleaning layer, the carbon black may be dispersed in a binder. The carbon black materials described above may be used alone, or two or more of them may be used in combination.

In cases where the carbon black is contained in the cleaning layer, the proportion of the carbon black should preferably be at most 5% by weight with respect to the weight of the ferromagnetic particles. The carbon black has antistatic effects, friction coefficient reducing effects, light blocking property imparting effects, and film strength improving effects on the cleaning layer. These effects vary in accordance with the kind of the carbon black used. Therefore, in the cleaning medium in accordance with the present invention, the kind of the carbon black, the proportion of the carbon black, and the combination of different carbon black materials may be varied between the cleaning layer and the lower coating layer, and the carbon black having specific characteristics, such as the particle size, the oil absorption, the electric conductance, and the pH value, may be selected in accordance with the characteristics of the cleaning layer or the lower coating layer which is to be obtained.

The cleaning layer may also contain abrasive particles as the inorganic particles. Examples of the materials for the abrasive particles include α-alumina having a degree of alphatization of at least 90%, β-alumina, silicon carbide, chromium oxide, cerium oxide, α-iron oxide, corundum, artificial diamond, silicon nitride, titanium carbide, titaniumoxide, silicon dioxide, andboronnitride. Principally, one of the above-enumerated abrasive particle materials having a Mohs hardness of at least 6 may be used alone, or two or more of them may be used in combination. Also, a composite material obtained from the above-enumerated abrasive particle materials (i.e, a composite material obtained by treating the surfaces of abrasive particles with different abrasive particles) may be used. The abrasive particles may also contain compounds or elements other than the main constituent. In such cases, if the proportion of the main constituent is at least 90%, the same effects can be obtained as when the abrasive particles do not contain the other compounds or elements. Examples of the abrasive particles include AKP-20, AKP-30, AKP-50, HIT-50, HIT-60, HIT-60A, HIT-70A, HIT-80, HIT-80G, and HIT-100, which are supplied by Sumitomo Chemical Co., Ltd.; G5, G7, and S-1, which are supplied by Nippon Chemical Industrial Co., Ltd.; and TF-100, and TF-140, which are supplied by Toda Kogyo K.K.

The particle size of the abrasive particles should preferably fall within the range of 0.01 μm to 2 μm. When necessary, abrasive particles having a certain particle size and abrasive particles having a different particle size may be used in combination. Alternatively, in cases where abrasive particles having a certain particle size are employed, the particle diameter distribution of the abrasive particles may be set to be wide, and the same effects as those obtained by combining the abrasive particles having different particle sizes may thereby be obtained. The tap density of the abrasive particles should preferably fall within the range of 0.3 g/cc to 2 g/cc. The water content of the abrasive particles should preferably fall within the range of 0.1% by weight to 5% by weight. The pH value of the abrasive particles should preferably fall within the range of 2 to 11, and the specific surface area of the abrasive particles should preferably fall within the range of 1 $m^2/g$ to 30 $m^2/g$. The abrasive particles may have an acicular shape, a spherical shape, or a dice-like shape. The abrasive particles having angles at portions of the shape have good cleaning properties and are therefore preferable. The proportion of the abrasive particles, which are contained as the inorganic particles in the cleaning layer, may fall within the range of 1% by weight to 45% by weight with respect to 100% by weight of the aforesaid ferromagnetic particles. In the cleaning medium in accordance with the present invention, the kind of the abrasive particles, the proportion of the abrasive particles, and the combination of different abrasive particle materials may be varied between the cleaning layer and the lower coating layer in accordance with the characteristics of the cleaning layer or the lower coating layer which is to be obtained. The abrasive particles may firstly be dispersed in the binder and may thereafter be added to the magnetic coating composition. The number of the abrasive particles, which are located on the surface and the side faces of the cleaning layer of the cleaning medium in accordance with the present invention should preferably be at least 5 pieces/100 $\mu m^2$.

As the additives contained in the lower coating layer or the cleaning layer of the cleaning medium in accordance with the present invention, the additives having the lubricating effects, the antistatic effects, the dispersing effects, the plasticizing effects, or the like, are employed. Examples of the additives include molybdenum disulfide; tungsten disulfide; graphite; boron nitride; graphite fluoride; a silicone oil; a silicone having a polar group; a fatty acid-modified silicone; a fluorine-containing silicone; a fluorine-containing alcohol; a fluorine-containing ester; a polyolefin; a polyglycol; an alkylphosphoric ester and its alkali metal salt; an alkylsulfuric ester and its alkali metal salt; a polyphenyl ether; a fluorine-containing alkylsulfuric ester and its alkali metal salt; a monobasic fatty acid having 10 to 24 carbon atoms (which fatty acid may have an unsaturated bond or maybe branched) and its metal salt (with Li, Na, K, Cu, or the like); a monohydric, dihydric, trihydric, tetrahydric, pentahydric, or hexahydric alcohol having 12 to 22 carbon atoms (which alcohol may have an unsaturated bond or may be branched); an alkoxy alcohol having 12 to 22 carbon atoms; a mono-fatty acid ester, a di-fatty acid ester, or a tri-fatty acid ester of a mono basic fatty acid having 10 to 24 carbon atoms (which fatty acid may have an unsaturated bond or may be branched) with a monohydric, dihydric, trihydric, tetrahydric, pentahydric, or hexahydric alcohol having 2 to 12 carbon atoms (which alcohol may have an unsaturated bond or may be branched); a fatty acid ester of a mono-alkyl ether of an alkylene oxide polymer; a fatty acid amide having 8 to 22 carbon atoms; and an aliphatic amine having 8 to 22 carbon atoms.

Specifically, examples of the additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. It is also possible to use nonionic surface active agents, such as an alkylene oxide compound, a glycerin compound, a glycidol compound, and an adduct of an alkyl phenol with ethylene oxide; cationic surface active agents, such as a cyclic amine, an ester amide, a quaternary ammonium salt, a hydantoin derivative, a heterocyclic compound, a phosphonium compound, and a sulfonium compound; anionic surface active agents containing acidic groups, such as a carboxylic acid group, a sulfonic acid group, a phosphoric acid group, a sulfuric ester group, and a phosphoric ester group; and amphoteric surface active agents, such as an amino acid, an amino sulfonic acid, a sulfate or a phosphate of an amino alcohol, and an alkyl betaine compound. The above-enumerated surface active agents are described in, for example, "Surface Active Agent Handbook", Sangyo Tosho K.K. The lubricating agents, the antistatic agents, and the like, need not necessarily be perfectly pure and may contain impurities, such as isomers, unreacted materials, side reaction products, decomposition products, and oxides, besides the main constituents. The proportions of these impurities should preferably be at most 30%, and should more preferably be at most 10%.

When necessary, the kinds and the proportions of the lubricating agents, the surface active agents, and the like, may be varied between the lower coating layer and the cleaning layer. For example, fatty acids having different melting temperatures may be employed in the lower coating layer and the cleaning layer, and the bleeding to the surface of the cleaning medium may thereby be controlled. Alternatively, esters having different boiling temperatures or different levels of polarity may be employed in the lower coating layer and the cleaning layer, and the bleeding to the surface of the cleaning medium may thereby be controlled. As another alternative, the proportion of the surface active agent may be adjusted such that the stability of the coating may be enhanced. As a further alternative, the amount of the lubricating agent added to the lower coating layer may be set to be large, and the lubricating effects may thereby be enhanced.

The addition of the entire portion or a portion of each additive may be carried out at any stage of the process for producing the coating composition. For example, the additive may be mixed with the inorganic particles before the kneading process is carried out. Alternatively, the additive may be added during the process for kneading the inorganic particles, the binder, and the solvent together. As another alternative, the additive may be added during or after the dispersing process. As a further alternative, the additive may be added immediately before the application of the coating composition. Also, in accordance with the desired layer characteristics, after the composition for the formation of the cleaning layer is applied onto the lower coating layer, a portion or the entire portion of the additive may be applied with the simultaneous or sequential coating technique, and the desired layer characteristics may thereby be obtained. Further, after a calendering process is carried out, or after a slitting process is carried out, the lubricating agent may be coated on the surface of the cleaning layer.

The lubricants, which may be employed in the cleaning medium in accordance with the present invention, are available under the trade names of, for example, NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor Oil-Hardened Fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl Stearate, Butyl Laurate, and Erucic Acid, which are supplied by Nippon Oil & Fats Co., Ltd.; Oleic Acid, which is supplied by Kanto Kagaku K.K.; FAL-205 and FAL-123, which are supplied by Takemoto Yushi K.K.; Njlub LO, Njlub IPM, and Sansocizer E4030, which are supplied by New Japan Chemical Co., Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935, which are supplied by Shin-Etsu Chemical Co., Ltd.; Armid P, Armid C, and Armoslip CP, which are supplied by Lion Akzo Co., Ltd.; Duomin TDO, which is supplied by Lion Corp.; BA-41G, which is supplied by The Nisshin Oil Mills, Ltd.; Profan 2012E, Newpol PE61, Ionet MS-400, Ionet MO-200, Ionet DL-200, Ionet DS-300, Ionet DS-1000, and Ionet DO-200, which are supplied by Sanyo Chemical Industries Ltd.

Organic solvents may be used in any proportion in the lower coating layer and the cleaning layer of the cleaning medium in accordance with the present invention. Examples of the organic solvents include ketones, such as acetone, methyl ethyl ketone, methyl isobutyl ketone, diisobutyl ketone, cyclohexanone, and isophorone; alcohols, such as methyl alcohol, ethyl alcohol, propyl alcohol, butyl alcohol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as tetrahydrofuran, ethylene glycol dimethyl ether, ethylene glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N,N-dimethylformamide; and hexane. The organic solvents need not necessarily be perfectly pure and may contain impurities, such as isomers, unreacted materials, side reaction products, decomposition products, oxides, and water, besides the main constituents. The proportions of these impurities should preferably be at most 30%, and should more preferably be at most 10%.

The same kind of organic solvent should preferably be employed in the cleaning layer and the lower coating layer of the cleaning medium in accordance with the present invention. However, the proportions of the organic solvent may be varied between the cleaning layer and the lower coating layer. A solvent (such as cyclohexane or dioxane) having a high surface tension should preferably employed in the lower coating layer such that the stability of the coating may be enhanced. Specifically, it is important that the arithmetic mean value of the solvent composition employed in the cleaning layer is not smaller than the arithmetic mean value of the solvent composition employed in the lower coating layer. In order for the dispersion properties to be enhanced, the polarity of the solvent should preferably be comparatively high. A solvent having a permittivity falling within the range of 15 to 20 should preferably be contained in the solvent composition and in a proportion of at least 50% by weight. The solubility parameter should preferably fall within the range of 8 to 11.

The thickness of the non-magnetic substrate of the cleaning medium in accordance with the present invention may be as thin as 2.0 $\mu$m to 10 $\mu$m. The total thickness of the cleaning layer and the lower coating layer may be $\frac{1}{100}$ to 2 times as thick as the thickness of the non-magnetic substrate. An adhesive layer may be formed between the non-magnetic substrate and the lower coating layer such that the adhesion between them may be enhanced. The thickness of the adhesive layer may fall within the range of 0.01 $\mu$m to 2 $\mu$m, and should preferably fall within the range of 0.02 $\mu$m to 0.5 $\mu$m. A back coating layer may be formed on the surface of the non-magnetic substrate on the side opposite to the cleaning layer. The thickness of the back coating layer may fall within the range of 0.1 $\mu$m to 2 $\mu$m, and should preferably fall within the range of 0.3 $\mu$m to 1.00 $\mu$m. As the materials for the adhesive layer and the back coating layer, any of known materials may be employed.

As the non-magnetic substrate of the cleaning medium in accordance with the present invention, any of known films having a micro Vickers hardness of at least 75 kg/mm$^2$ and having been subjected to biaxial orientation may be employed. Examples of the materials for the non-magnetic substrate include a polyethylene terephthalate, a polyethylene naphthalate, a polyamide, a polyimide, a polyamide-imide, an aromatic polyamide, and a polybenzoxazole. In particular, the non-magnetic substrate should preferably be constituted of an aramid resin, a polyethylene naphthalate, or a polyethylene terephthalate. The non-magnetic substrate may be subjected to corona discharge treatment, plasma treatment, adhesion facilitating treatment, heat treatment, dust-resistant treatment, or the like.

In order for the objects of the present invention to be accomplished, the surface roughness Ra, expressed in terms of arithmetic mean deviation, of the surface of the non-magnetic substrate, on which surface the cleaning layer is to be formed, should fall within the range of 0.5 nm to 7 nm. Thus the value of the surface roughness Ra of the surface of the non-magnetic substrate should be small, and the non-magnetic substrate should preferably be free from coarse protrusions of 1 μm or larger. Also, the roughness form of the surface of the non-magnetic substrate can be controlled freely by the size and the amount of fillers, which are added to the non-magnetic substrate when necessary. Examples of the fillers include oxides and carbonates of Al, Ca, Si, and Ti, which may be crystalline or amorphous, and fine organic powder, such as an acrylic type of fine powder and a melamine type of fine powder. Further, such that the durability against the movement operation may be kept high, the roughness of the surface of the non-magnetic substrate, on which surface the back coating layer is formed, should preferably be rougher than the roughness of the surface of the non-magnetic substrate, on which surface the cleaning layer is formed. The surface roughness Ra of the surface of the non-magnetic substrate, on which surface the back coating layer is formed, should preferably be at least 1 nm, and should more preferably be at least 4 nm. In cases where the roughness of the surface of the non-magnetic substrate, on which surface the cleaning layer is formed, and the roughness of the surface of the non-magnetic substrate, on which surface the back coating layer is formed, are to be set to be different from each other, a substrate having a dual constitution may be employed, or a coating layer may be overlaid upon the substrate surface.

The F-5 value of the non-magnetic substrate along the direction of the tape movement (MD direction), i.e. along the longitudinal direction of the tape, should preferably fall within the range of 10 kg/mm$^2$ to 50 kg/mm$^2$. The F-5 value of the non-magnetic substrate along the width direction of the tape (TD direction) should preferably fall within the range of 10 kg/mm$^2$ to 30 kg/mm$^2$. Ordinarily, the F-5 value of the non-magnetic substrate along the longitudinal direction of the tape is set to be larger than the F-5 value of the non-magnetic substrate along the width direction of the tape. However, in cases where it is necessary for the strength of the non-magnetic substrate along the width direction of the tape to be set to be particularly large, the F-5 value of the non-magnetic substrate along the width direction of the tape may be set to be larger than the F-5 value of the non-magnetic substrate along the longitudinal direction of the tape. The degree of heat shrinkage, at 100° C.×30 min, of the non-magnetic substrate along each of the direction of the tape movement and the width direction of the tape should preferably be at most 3%, and should more preferably beat most 1.5%. Also, the degree of heat shrinkage, at 80° C.×30 min, of the non-magnetic substrate along each of the direction of the tape movement and the width direction of the tape should preferably be at most 1%, and should more preferably be at most 0.5%. The breaking strength of the non-magnetic substrate along each of the direction of the tape movement and the width direction of the tape should preferably fall within the range of 5 kg/mm$^2$ to 100 kg/mm$^2$. The Young's modulus of the non-magnetic substrate should preferably fall within the range of 100 kg/mm$^2$ to 3,000 kg/mm$^2$. The light transmittance with respect to light having a wavelength of 900 nm should preferably be at most 30%, and should more preferably be at most 3%.

Each of the processes for producing the coating compositions for forming the lower coating layer and the cleaning layer of the cleaning medium in accordance with the present invention comprises at least a kneading process, a dispersing process, and mixing processes, which may be carried, when necessary, before and after the kneading process and the dispersing process. Each of the processes may be carried out in two or more steps. The addition of each of the raw materials, such as the ferromagnetic particles, the binder, the carbon black, the abrasive particles, the antistatic agent, the lubricating agent, and the solvent, may be carried out at the initial stage or the intermediate stage of an arbitrary process. Also, the entire amount of each of the raw materials may be divided into two or more portions, and the two or more portions of the raw material may be added in two or more different processes. For example, the entire amount of a polyurethane may be divided into three portions, and the three portions of the polyurethane may be added respectively in the kneading process, the dispersing process, and the mixing process which is carried out for adjusting the viscosity of the coating composition after the dispersing process.

In order to accomplish the objects of the present invention, a conventional production technique may be utilized at part of each process. In the kneading process, a kneader having a strong kneading power, such as a continuous kneader or a pressure kneader, should preferably be utilized. For example, in cases where the continuous kneader or the pressure kneader is utilized, the ferromagnetic particles and the entire amount of the binder or a portion of the binder (preferably, at least 30% of the entire amount of the binder) in proportions falling within the range of 15 to 500 parts per 100 parts of the ferromagnetic particles are subjected to the kneading process. The kneading techniques are described in detail in, for example, Japanese Unexamined Patent Publication Nos. 64(1989)-79274 and 1(1989)-166338. In cases where the non-magnetic coating composition for forming the lower coating layer is prepared, a dispersing medium having a high specific gravity should preferably be utilized. As the dispersing medium, zirconia beads are preferable.

By way of example, as the apparatus and the method for forming the cleaning medium having the dual-layer constitution in accordance with the present invention, one of the techniques described below may be employed.

(1) The lower coating layer is firstly applied onto the substrate by using a gravure coater, a roll coater, a blade coater, or an extrusion coater, which is ordinarily employed for the application of a magnetic coating composition. While the lower coating layer is being wet, the cleaning layer is applied onto the lower coating layer by using one of substrate press types of extrusion coaters, which are disclosed in, for example, Japanese Patent Publication No. 1(1989)-46186, and Japanese Unexamined Patent Publication Nos. 60(1985)-238179 and 2(1990)-265672.

(2) The lower coating layer and the cleaning layer are applied approximately simultaneously by using a single coating head, which has two coating composition passing slits and is disclosed in, for example, Japanese Unexamined Patent Publication No. 63(1988)-88080, 2(1990)-17971, or 2(1990)-265672.

(3) The lower coating layer and the cleaning layer are applied approximately simultaneously by using an extrusion coater provided with a back-up roll, which is disclosed in, for example, Japanese Unexamined Patent Publication No. 2(1990)-174965.

Such that the magnetic particles may be prevented from agglomerating, shearing force should preferably be imparted to the coating composition, which is located in the coating head, with one of methods disclosed in, for example, Japanese Unexamined Patent Publication Nos. 62(1987)-95174 and 1(1989)-236968. Also, as for the viscosity of the coating composition, the viscosity range disclosed in, for example, Japanese Unexamined Patent Publication No. 3(1991)-8471 should be satisfied.

In order for the cleaning medium in accordance with the present invention to be obtained, an orientating process may be carried out on the ferromagnetic particles contained in the cleaning layer. The orientating process should preferably be carried out by utilizing a solenoid having a magnetic force of at least 1,000G and a cobalt magnet having a magnetic force of at least 2,000G, which are located such that the same poles may stand facing each other. Such that the state of orientation of the ferromagnetic particles after being dried may become as good as possible, an appropriate drying process should preferably be carried out before the orientation process is carried out.

Before the non-magnetic lower coating layer and the cleaning layer are formed with the simultaneous dual-layer coating technique, an adhesive layer containing a polymer as the main constituent should preferably be formed, or a known technique for enhancing the adhesion with corona discharge, UV irradiation, or EB irradiation should preferably be carried out.

When necessary, a calendering process may be carried out in order to adjust the surface roughness. As the calendering rolls, heat-resistant plastic rolls constituted of an epoxy resin, a polyimide resin, a polyamide resin, a polyimide-amide resin, or the like, may be employed. It is also possible to employ metal rolls. The calendering temperature should preferably fall within the range of 15° C. to 50° C. The linear pressure should preferably fall within the range of 5 kg/m to 100 kg/m, and the speed should preferably fall within the range of 50 m/min to 400 m/min.

The coefficient of friction of the cleaning layer surface and the opposite surface of the cleaning medium in accordance with the present invention with respect to SUS420J should preferably fall within the range of 0.1 to 0.5, and should more preferably fall within the range of 0.2 to 0.3. The surface resistivity should preferably fall within the range of $10^4$ to $10^{12}$ ohms/sq. The modulus at 0.5% elongation of the cleaning layer along each of the direction of the tape movement and the width direction of the tape should preferably fall within the range of 100 kg/mm$^2$ to 2,000 kg/mm$^2$. The breaking strength should preferably fall within the range of 1 kg/cm$^2$ to 30 kg/cm$^2$.

The cleaning medium as a whole should preferably be formed such that the Young's modulus along the longitudinal direction (MD direction) may fall within the range of 300 kg/mm$^2$ to 1,200 kg/mm$^2$, such that the Young's modulus along the width direction (TD direction) may fall within the range of 200 kg/mm$^2$ to 1,200 kg/mm$^2$, and such that the ratio of the Young's modulus along the longitudinal direction to the Young's modulus along the width direction may be between 1:2 and 2:1. The residual elongation of the cleaning medium should preferably be at most 0.5%. The degree of heat shrinkage at every temperature not higher than 100° C. should preferably be at most 1%, should more preferably be at most 0.5%, should most preferably be at most 0.1%, and should ideally be 0%. The glass transition temperature (i.e., the temperature at which the loss modulus in dynamic visco-elasticity measurement carried out at 110 Hz is maximum) of the cleaning layer should preferably fall within the range of 50° C. to 120° C. The glass transition temperature of the lower coating layer should preferably fall within the range of 0° C. to 100° C. The loss tangent should preferably be at most 0.2. If the loss tangent is very large, an adhesion failure will occur. The proportion of the residual solvent contained in the cleaning layer should preferably be at most 100 mg/m$^2$, and should more preferably be at most 10 mg/m$^2$. The proportion of the residual solvent contained in the cleaning layer should preferably be lower than the proportion of the residual solvent contained in the lower coating layer. The void volume in each of the lower coating layer and the cleaning layer should preferably be at most 50% by volume, and should more preferably be at most 40% by volume.

As described above, the cleaning layer of the cleaning medium in accordance with the present invention has the magnetic characteristics such that the coercive force Hc along the direction of the tape movement, as measured with VSM under a magnetic field of 10 kOe, may fall within the range of 500 Oe to 3,000 Oe. Also, the squareness ratio falls within the range of 0.6 to 0.98. The squareness ratio should preferably be at least 0.80, and should more preferably be at least 0.85. The squareness ratio along the two directions, which are normal to the direction of the tape movement, should preferably be at most 80% of the squareness ratio along the direction of the tape movement. The SFD of the cleaning layer should preferably be at most 0.6, should more preferably be at most 0.5, and should ideally be 0. The remanence coercive force Hr along the longitudinal direction should preferably fall within the range of 1,800 Oe to 3,000 Oe. The coercive force Hc and the remanence coercive force Hr along the vertical direction should preferably fall within the range of 1,000 Oe to 5,000 Oe. The surface roughness Ra, expressed in terms of arithmetic mean deviation, of the cleaning layer should preferably fall within the range of 1.0 nm to 7.0 nm. However, the value of the surface roughness Ra of the cleaning layer should be set appropriately in accordance with the characteristics of the cleaning layer which is to be obtained. The RMS surface roughness $R_{RMS}$, as calculated with the rating using an interatomic force microscope (AFM), should preferably fall within the range of 2 nm to 15 nm.

The cleaning medium in accordance with the present invention comprises the lower coating layer and the cleaning layer. It will be understood easily that the physical characteristics may be varied for the different layers in accordance with the characteristics of the cleaning medium which is to be obtained. For example, the modulus of elasticity of the cleaning layer may be set to be high such that the durability against movement can be enhanced, and the modulus of elasticity of the lower coating layer may be set to be lower than the modulus of elasticity of the cleaning layer such that the state of contact of the cleaning medium with the magnetic head can be kept good. Also, the state of contact with the magnetic head can be improved by altering the tensilizing method for the substrate. In cases where the substrate is tensilized in the direction, which is normal to the longitudinal direction of the tape, a good state of contact with the magnetic head can ordinarily be obtained.

EXAMPLES

The present invention will further be illustrated by the following nonlimitative examples. In these examples, the term "parts" means parts by weight.

Example 1

As for each of the coating composition for the lower coating layer and the coating composition for the cleaning layer, which are described below, the constituents were kneaded together by using a continuous kneader and were then subjected to a dispersing process in which a sand mill was used.

| [Coating composition for a lower coating layer] | |
|---|---|
| Non-magnetic inorganic particles | 100 parts |
| $TiO_2$ (TTO-55A supplied by Ishihara Sangyo Kaisha, Ltd.) | |
| Mean primary particle diameter: 0.05 μm | |
| Specific surface area (BET method): 18 $m^2/g$ | |
| pH: 7 | |
| Carbon black | 20 parts |
| Mean primary particle diameter: 18 mμ | |
| DBP oil absorption: 80 ml/100 g | |
| pH: 8.0 | |
| Specific surface area (BET method): 250 $m^2/g$ | |
| Volatile content: 1.5% | |
| Vinyl chloride-vinyl acetate-vinyl alcohol copolymer | 12 parts |
| Content of $-N(CH_3)_3^+Cl^-$ polar group: $5 \times 10^{-4}$ eq/g | |
| Composition ratio: 86:13:1 | |
| Degree of polymerization: 400 | |
| Polyester polyurethane resin | 5 parts |
| Neopentyl glycol/caprolactone polyol/MDI = 0.9/2.6/1 | |
| Content of $-SO_3Na$ group: $1 \times 10^{-4}$ eq/g | |
| Butyl stearate | 1 part |
| Stearic acid | 1 part |
| Methyl ethyl ketone | 200 parts |
| [Coating composition for a cleaning layer] | |
| Fine ferromagnetic metal particles | 100 parts |
| (Fe/Zn/Ni = 92/4/4) | |
| Coercive force Hc: 1,600 Oe | |
| Specific surface area (BET method): 60 $m^2/g$ | |
| Crystallite size: 195A | |
| Particle size (longer axis length): 0.20 μm | |
| Acicular ratio: 10 | |
| Saturation magnetization σS: 130 emu/g | |
| Vinyl chloride copolymer | 12 parts |
| Content of $-SO_3Na$ group: $1 \times 10^{-4}$ eq/g | |
| Degree of polymerization: 300 | |
| Polyester polyurethane resin | 3 parts |
| Neopentyl glycol/caprolactone polyol/MDI = 0.9/2.6/1 | |
| Content of $-SO_3Na$ group: $1 \times 10^{-4}$ eq/g | |
| α-Alumina | 2 parts |
| Particle size: 0.3 μm | |
| Carbon black | 0.5 part |
| Mean particle diameter: 0.10 μm | |
| Butyl stearate | 1 part |
| Stearic acid | 2 parts |
| Methyl ethyl ketone | 200 parts |

As for the coating composition for the lower coating layer, 1 part of a polyisocyanate was added to the resulting dispersion. Also, as for the coating composition for the cleaning layer, 3 parts of a polyisocyanate were added to the resulting dispersion. Thereafter, 40 parts of butyl acetate were added to each of the coating composition for the lower coating layer and the coating composition for the cleaning layer. Each coating composition was then subjected to a filtrating process with a filter having a mean pore diameter of 1 μm. In this manner, the coating composition for forming the lower coating layer and the coating composition for forming the cleaning layer were prepared.

Thereafter, the coating composition for forming the lower coating layer and the coating composition for forming the cleaning layer were applied onto a polyethylene terephthalate substrate by using a simultaneous dual-layer coating technique. Specifically, thickness of the polyethylene naphthalate substrate was 7 μm, and the surface roughness Ra, expressed in terms of arithmetic mean deviation, of the substrate surface, on which the cleaning layer was to be formed, was equal to 0.01 μm. Also, the coating composition for forming the lower coating layer was applied onto the substrate and at a rate such that the dry thickness of the lower coating layer might be 2 μm. Immediately after the coating composition for forming the lower coating layer was applied onto the substrate, the coating composition for forming the cleaning layer was applied onto the coating composition for forming the lower coating layer and at a rate such that the dry thickness of the cleaning layer might be 0.3 μm. While the two layers were being wet, they were subjected to an orientating process, in which a cobalt magnet having a magnetic force of 3,000G and a solenoid having a magnetic force of 1,500G were used. The two layers were then dried and subjected to a calendering process, in which a seven-stage calendering equipment provided with metal rolls and epoxy resin rolls was used. The calendering process was carried out at a temperature of 40° C. and at a speed of 200 m/min. Thereafter, a back coating layer having a thickness of 0.5 μm was formed on the substrate surface on the side of the substrate opposite to the cleaning layer. The thus obtained cleaning tape web was slit into a width of 8 mm, and a sample of a cleaning tape for an 8 mm video device was thereby prepared.

Example 2

A sample of a cleaning tape was prepared in the same manner as that in Example 1, except that the mean primary particle diameter of the non-magnetic inorganic particles in the lower coating layer was set to be as large as 0.07 μm.

Example 3

A sample of a cleaning tape was prepared in the same manner as that in Example 1, except that the thickness of the cleaning layer was set to be as thick as 0.9 μm and the thickness of the lower coating layer was set to be as thin as 1.4 μm.

Comparative Example 1

A sample of a cleaning tape was prepared in the same manner as that in Example 1, except that the thickness of the cleaning layer was set to be as thick as 1.1 μm.

Comparative Example 2

A sample of a cleaning tape was prepared in the same manner as that in Example 1, except that the mean primary particle diameter of the non-magnetic inorganic particles in the lower coating layer was set to be as large as 0.1 μm.

Comparative Example 3

A sample of a cleaning tape was prepared in the same manner as that in Example 1, except that 100 parts of α-alumina (mean primary particle diameter: 0.3 μm) were employed as the non-magnetic inorganic particles in the lower coating layer in lieu of titanium oxide.

Comparative Example 4

A sample of a cleaning tape was prepared in the same manner as that in Example 1, except that 100 parts of carbon black (mean primary particle diameter: 0.05 μm) were employed as the non-magnetic inorganic particles in the lower coating layer in lieu of titanium oxide.

Example 4

A sample of a cleaning tape was prepared in the same manner as that in Example 1, except that 100 parts of α-alumina (mean primary particle diameter: 0.06 μm) were employed as the non-magnetic inorganic particles in the lower coating layer in lieu of titanium oxide.

Example 5

A sample of a cleaning tape was prepared in the same manner as that in Example 1, except that 100 parts of $SnO_2$ (mean primary particle diameter: 0.05 μm) were employed as the non-magnetic inorganic particles in the lower coating layer in lieu of titanium oxide.

Example 6

A sample of a cleaning tape was prepared in the same manner as that in Example 1, except that 100 parts of $BaSO_4$ (mean primary particle diameter: 0.05 μm) were employed as the non-magnetic inorganic particles in the lower coating layer in lieu of titanium oxide.

Example 7

A sample of a cleaning tape was prepared in the same manner as that in Example 1, except that 100 parts of ZnO (mean primary particle diameter: 0.05 μm) were employed as the non-magnetic inorganic particles in the lower coating layer in lieu of titanium oxide.

Example 8

A lower coating layer and a cleaning layer were formed in the manner described below, and a sample of a cleaning tape for use in digital audio devices was thereby prepared.

| [Coating composition for a lower coating layer] | |
|---|---|
| Non-magnetic inorganic particles<br>(acicular α-$Fe_2O_3$)<br>Longer axis length: 0.3 μm<br>Acicular ratio: 8 | 100 parts |
| Carbon black<br>Mean primary particle diameter: 20 mμ | 5 parts |
| Vinyl chloride copolymer<br>containing a —$SO_3Na$ group and an epoxy group<br>Molecular weight: 45,000 | 8 parts |
| Polyurethane resin<br>containing a —$SO_3Na$ group<br>Molecular weight: 45,000 | 5 parts |
| Cyclohexane | 100 parts |
| Methyl ethyl ketone | 100 parts |

The constituents listed above were subjected to a mixing and dispersing process in a sand mill for four hours. Thereafter, 5 parts of a polyisocyanate (Coronate L, supplied by Nippon Polyurethane K.K.), 5 parts of stearic acid, and 10 parts of butyl stearate were added to the resulting dispersion. In this manner, the coating composition for the lower coating layer was prepared.

| [Coating composition for a cleaning layer] | |
|---|---|
| Fine ferromagnetic metal particles<br>Fe alloy particles (Fe/Ni/Co)<br>Fe:Ni:Co = 92:6:2<br>Coercive force Hc: 1,600 Oe<br>Saturation magnetization σS: 135 emu/g<br>Longer axis length: 0.18 μm<br>Acicular ratio: 9 | 100 parts |
| Vinyl chloride copolymer<br>containing a —$SO_3Na$ group and an epoxy group | 10 parts |
| Polyurethane resin<br>containing a —$SO_3Na$ group<br>Molecular weight: 45,000 | 5 parts |
| α-Alumina<br>Mean particle diameter: 0.2 μm | 5 parts |
| Cyclohexanone | 150 parts |
| Methyl ethyl ketone | 150 parts |

The constituents listed above were subjected to a mixing and dispersing process in a sand mill for six hours. Thereafter, 5 parts of a polyisocyanate (Coronate L, supplied by Nippon Polyurethane K.K.), 5 parts of stearic acid, and 10 parts of butyl stearate were added to the resulting dispersion. In this manner, the coating composition for the cleaning layer was prepared.

Thereafter, the coating composition for the lower coating layer and the coating composition for the cleaning layer were applied onto a polyethylene terephthalate substrate by using a simultaneous dual-layer coating technique, in which doctors having different gaps were used. Specifically, thickness of the polyethylene naphthalate substrate was 7 μm, and the surface roughness Ra, expressed in terms of arithmetic mean deviation, of the substrate surface, on which the cleaning layer was to be formed, was equal to 0.01 μm. The two layers having been coated on the substrate were subjected to an orientating process with a permanent magnet, dried, and subjected to a calendering process. The coating thickness of the cleaning layer was 0.3 μm, and the coating thickness of the lower coating layer was 2.0 μm. The thus obtained web was slitted to a width of 3.81 mm, and a sample of a cleaning tape corresponding to a digital audio tape was thereby prepared.

Comparative Example 5

A sample of a cleaning tape was prepared in the same manner as that in Example 8, except that acicular α-$Fe_2O_3$ having a longer axis length of 0.5 μm and an acicular ratio of 10 was employed as the non-magnetic inorganic particles in the lower coating layer.

Example 9

A sample of a cleaning tape was prepared in the same manner as that in Example 8, except that acicular $TiO_2$ having a longer axis length of 0.1 μm and an acicular ratio of 5 was employed as the non-magnetic inorganic particles in the lower coating layer in lieu of α-iron oxide.

Comparative Example 6

A sample of a cleaning tape was prepared in the same manner as that in Example 8, except that acicular $TiO_2$ having a longer axis length of as large as 1.2 μm and an acicular ratio of as large as 15 was employed as the non-magnetic inorganic particles in the lower coating layer in lieu of α-iron oxide.

Comparative Example 7

A sample of a cleaning tape was prepared in the same manner as that in Example 8, except that the lower coating layer was not formed and only the cleaning layer (having a thickness of 3.3 μm) was formed on the substrate.

Example 10

In this example, a sample of a cleaning disk for floppy disk drive units was prepared. The same coating composition for the lower coating layer and the same coating composition for the cleaning layer as those in Example 8 were used.

Firstly, the coating composition for the lower coating layer was applied onto the front surface of a polyethylene terephthalate substrate having a thickness of 75 μm. Thereafter, while the applied coating composition for the lower coating layer was being in the wet state, the coating composition for the cleaning layer was applied onto it. Also, the same coating composition applying operations were carried out on the back surface of the substrate. The dry layer thickness of the lower coating layer was 3 μm, and the dry layer thickness of the cleaning layer was 0.3 μm. Thereafter, a calendering process was carried out, and a cleaning medium web was thereby obtained. The cleaning medium web was then punched into a 3.5-inch disk-like piece. The punched piece was then set in a 3.5-inch cartridge, in which liners had been located. Predetermined mechanism parts were added to the cartridge, and a sample of a cleaning disk was thereby prepared.

Example 11

A sample of a cleaning disk was prepared in the same manner as that in Example 10, except that the coating composition for the cleaning layer was altered to the one described below.

| [Coating composition for a cleaning layer] | |
|---|---|
| Fine ferromagnetic metal particles<br>(Co-substituted barium ferrite)<br>Mean plate diameter: 0.06 μm<br>Platy ratio: 6<br>Specific surface area: 35 m²/g | 100 parts |
| Vinyl chloride copolymer<br>Content of —SO$_3$Na group: 8 × 10$^{-5}$ eq/g<br>Degree of polymerization: 300 | 9 parts |
| Fine abrasive particles<br>(Cr$_2$O$_3$)<br>Mean particle diameter: 0.2 μm | 7 parts |
| Toluene | 30 parts |
| Methyl ethyl ketone | 30 parts |

After the constituents listed above were kneaded together for approximately one hour in a kneader, the constituents listed below were added.

| | |
|---|---|
| Polyester polyurethane resin<br>Neopentyl glycol/caprolactone<br>polyol/MDI = 0.9/2.6/1<br>Content of —SO$_3$Na group: 1 × 10$^{-4}$ eq/g<br>Mean molecular weight: 35,000 | 5 parts |
| Toluene | 200 parts |
| Methyl ethyl ketone | 200 parts |

The resulting mixture was subjected to a dispersing process for approximately two hours in the kneader. Thereafter, the constituents listed below were added.

| | |
|---|---|
| Carbon black<br>(Ketjen Black EC, supplied by<br>Ketjen Black International Company)<br>Mean particle diameter: 20 to 30 mμ | 5 parts |
| α-Alumina<br>(AKP-12, supplied by<br>Sumitomo Chemical Co., Ltd.)<br>Mean particle diameter<br>(longest diameter a): 0.5 μm | 2 parts |

The resulting mixture was subjected to a dispersing process in a sand grinder at 2,000 revolutions and for two hours. Further, the constituents listed below were added.

| | |
|---|---|
| Polyisocyanate<br>(Coronate L, supplied by<br>Nippon Polyurethane K.K.) | 6 parts |
| Tridecyl stearate | 6 parts |

The resulting mixture was again subjected to a dispersing process in the sand grinder, and a coating composition for the cleaning layer was thereby obtained.

As for the samples of the cleaning media having been obtained in the Examples and the Comparative Examples described above, the thickness of the cleaning layer, the thickness of the lower coating layer, the kind of particles, the mean particle diameter, and the like, were determined. The results shown in Tables 1 to 3 described below were obtained. Also, cleaning tests were carried out by using the respective samples, and the rate of wear of the magnetic head, the magnetic head cleaning power, and the occurrence of scratches on the cleaned magnetic head were measured. The results shown in Tables 1 to 3 were obtained.

The measured values were obtained with the methods described below.

(Measurement of thicknesses of the cleaning layer and the lower coating layer)

The cleaning medium was cut to a thickness of approximately 0.1 μm along the longitudinal direction of the cleaning medium by using a diamond cutter. The cut piece of the cleaning medium was observed with a transmission type of electron microscope and at 30,000-power magnification, and the photograph of the cut piece was taken. The photograph print size was the A4 size.

Thereafter, the interfaces among the substrate, the lower coating layer, and the cleaning layer were visually determined by paying particular attention to the difference between the shape of the non-magnetic inorganic particles contained in the lower coating layer and the shape of the ferromagnetic particles contained in the cleaning layer. The interfaces were bordered in black. Also, the surface of the cleaning layer was bordered in black. The distances between the border lines were measured by using an image processing apparatus (IBAS2, supplied by Zeiss Co.). The measurement was made with respect to a plurality of measurement points sampled over the range of a sample photograph length of 21 cm. The simple arithmetic mean value of the measured values was taken as the thickness of each of the cleaning layer and the lower coating layer.

(Specific surface area measured with the BET method)

The specific surface area was measured with Quantasorb (supplied by US Quantachrome Co.). After dehydration was carried out in a nitrogen atmosphere at 250° C. for 30 minutes, the measurement was made with the BET single-point method (partial pressure: 0.30).

29

(Magnetic characteristics)

As for the coercive force Hc, the remanent magnetic flux density Br, the squareness ratio, the amount of magnetization, and the like, the measurement was carried out under an external magnetic field of 10 kOe and by using a vibrating sample type of magnetic flux meter (supplied by Toei Kogyo K.K.), and the values were calculated from the magnetization curve. The maximum magnetic flux density Bm was measured with the aforesaid method for measuring the thickness of the cleaning layer.

(Surface roughness Ra, expressed in terms of arithmetic mean deviation)

The surface roughness Ra of the surface of the medium was measured with the MIRAU method over an area of approximately 250 μm×250 μm by using TOPO3D (supplied by WYKO Co. The measurement wavelength was approximately 650 nm, and spherical surface compensation and cylinder compensation were carried out. The used device was the non-contact type of surface texture measuring instrument, in which the measurement was carried out with light interference.

(Particle diameters of ferromagnetic particles and non-magnetic inorganic particles)

The mean particle diameter was determined by using both of a method, wherein a photograph was taken with a transmission type of electron microscope, and wherein the shorter axis diameter and the longer axis diameter of the particles were directly read out from the photograph, and a method, wherein the shorter axis diameter and the longer axis diameter of the particles were read out by tracing the photograph, which was taken with the transmission type of electron microscope, with an image analyzing apparatus (IBASS1, supplied by Karl Zeiss Co.).

(Crystallite size of ferromagnetic particles)

As for the γ-iron oxide ferromagnetic particles, the crystallite size was determined with the diffraction X-ray method and from the spread of the half-width of the diffracted rays with respect to each of the (4, 4, 0) face and the (2, 2, 0) face. As for the metal ferromagnetic particles, the crystallite size was determined with the diffraction X-ray method and from the spread of the half-width of the diffracted rays with respect to each of the (1, 1, 0) face and the (2, 2, 0) face.

(Rate of wear of the magnetic head)

The cleaning tape was moved in a Hi-8 Deck EV-S900 device at 5° C. and relative humidity of 80% for 10 minutes. The height of the magnetic head of the device before being cleaned with the cleaning tape and the height of the magnetic head after being cleaned with the cleaning tape were measured and taken as the rate of wear of the magnetic head.

(Magnetic head cleaning power)

The output was firstly measured with a Hi-8 Deck EV-S900 device by using Hi-8 Super DC P6-120 (supplied by Fuji Photo Film Co., Ltd.). A standard tape having been prepared for causing clogging to occur was then moved in the aforesaid Hi-8 Deck EV-S900 device, and the state of the magnetic head of the device was observed with an electronic flash equipment. When much dirt had clung to the magnetic head, the movement of the standard tape was ceased, and it was confirmed that the output was zero. Thereafter, each sample of the cleaning tape was moved in the Hi-8 Deck EV-S900 device for one minute, and the output of the Hi-8 Super DC P6-120 (supplied by Fuji Photo Film Co., Ltd.) was measured with the Hi-8 Deck EV-S900 device. The difference in units of dB between the originally measured output and the finally measured output was calculated and taken as the value for rating the magnetic head cleaning power.

As for the sample of the cleaning disk described above, the cleaning power was measured in the manner described below. Specifically, in a 3.5-inch floppy disk drive unit operating on MS-DOS operating system, dirt was caused to cling to the magnetic head by using an MS-DOS formatted head dirt generating disk in accordance with the standards of Fuji Photo Film Co., Ltd., such that the magnetic head could not read signals anymore. The cleaning disk was then inserted into the floppy disk drive unit and operated for 60 seconds. Thereafter, a judgment was made as to whether signals can be read from a floppy disk, on which the signals had been recorded.

As will be clear from Tables 1, 2, and 3, with the samples of Examples 1 through 11 in accordance with the present invention, the rate of wear of the magnetic head does not become very high, no scratch occurs on the cleaned magnetic head, and good cleaning power can be obtained. Thus with the samples in accordance with the present invention, the results appropriate for the cleaning medium for the magnetic head can be obtained.

TABLE 1

| | | Sample No. | | | | | |
|---|---|---|---|---|---|---|---|
| | | Ex. 1 | Ex. 2 | Ex. 3 | Comp. Ex. 1 | Comp. Ex. 2 | Comp. Ex. 3 |
| Cleaning layer | Thickness (μm) | 0.3 | → | 0.9 | 1.1 | 0.3 | → |
| | Kind of particles | Fe/Zn/Ni | → | → | → | → | → |
| Lower coating layer | Thickness (μm) | 2.0 | → | 1.4 | 2.0 | → | → |
| | Kind of particles | $TiO_2$ | → | → | → | → | α-Alumina |
| | Mean particle dia. (μm) | 0.05 | 0.07 | 0.05 | → | 0.1 | 0.3 |
| | Longer axis length (μm) | — | — | — | — | — | — |
| | Acicular ratio | — | — | — | — | — | — |

TABLE 1-continued

| | Ex. 1 | Ex. 2 | Ex. 3 | Comp. Ex. 1 | Comp. Ex. 2 | Comp. Ex. 3 |
|---|---|---|---|---|---|---|
| Surface roughness Ra (nm) | 4.2 | 4.7 | 5.8 | 6.4 | 6.3 | 6.0 |
| Rate of head wear (μm/10 min.) | 0.1 | 0.1 | 0.2 | 0.5 | 0.6 | 0.5 |
| Head cleaning power, output (dB) | 0.2 | 0 | 0.1 | −0.3 | 0.2 | −1.2 |
| Number of head scratches | 0 | 0 | 0 | 1 | 0 | 3 |

TABLE 2

| | | Comp. Ex. 4 | Ex. 4 | Ex. 5 | Ex. 6 | Ex. 7 | Ex. 8 |
|---|---|---|---|---|---|---|---|
| Cleaning layer | Thickness (μm) | 0.3 | → | → | → | → | → |
| | Kind of particles | Fe/Zn/Ni | → | → | → | → | Fe/Ni/Co |
| Lower coating layer | Thickness (μm) | 2.0 | → | → | → | → | → |
| | Kind of particles | Carbon black | α-Alumina | $SnO_2$ | $BaSO_4$ | ZnO | $\alpha Fe_2O_3$ |
| | Mean particle dia. (μm) | 0.05 | 0.06 | 0.05 | 0.05 | 0.05 | — |
| | Longer axis length (μm) | — | — | — | — | — | 0.3 |
| | Acicular ratio | — | — | — | — | — | 8 |
| Surface roughness Ra (nm) | | 6.7 | 4.8 | 5.0 | 4.6 | 5.1 | 4.9 |
| Rate of head wear (μm/10 min.) | | 0.5 | 0.3 | 0.1 | 0.1 | 0.1 | 0.1 |
| Head cleaning power, output (dB) | | 0.3 | −0.2 | −0.1 | −0.2 | −0.2 | −0.2 |
| Number of head scratches | | 0 | 0 | 0 | 1 | 0 | 1 |

TABLE 3

| | | Comp. Ex. 5 | Ex. 9 | Comp. Ex. 6 | Comp. Ex. 7 | Ex. 10 | Ex. 11 |
|---|---|---|---|---|---|---|---|
| Cleaning layer | Thickness ($\mu$m) | 0.3 | → | → | 3.3 | 0.3 | → |
| | Kind of particles | Fe/Ni/Co | → | → | → | → | Ba ferrite |
| Lower coating layer | Thickness ($\mu$m) | 2.0 | → | → | None | 3.0 | → |
| | Kind of particles | $\alpha Fe_2O_3$ | Acicular $TiO_2$ | → | — | $\alpha Fe_2O_3$ | → |
| | Mean particle dia. ($\mu$m) | — | — | — | — | — | — |
| | Longer axis length ($\mu$m) | 0.5 | 0.1 | 1.2 | — | 0.3 | → |
| | Acicular ratio | 10 | 5 | 15 | — | 8 | → |
| Surface roughness Ra (nm) | | 5.9 | 3.9 | 6.7 | 7.8 | 4.9 | 4.9 |
| Rate of head wear ($\mu$m/10 min.) | | 0.5 | 0.1 | 0.8 | 1.2 | — | — |
| Head cleaning power, output (dB) | | 0.2 | −0.2 | 0.3 | 0.3 | ○ | ○ |
| Number of head scratches | | 0 | 0 | 0 | 0 | — | — |

What is claimed is:

1. A cleaning medium for cleaning a magnetic head of magnetic recording devices, consisting essentially of:
   i) a non-magnetic substrate,
   ii) a lower coating layer, which is overlaid upon the non-magnetic substrate and primarily contains a binder and non-magnetic inorganic particles dispersed in the binder, and
   iii) a cleaning layer, which is overlaid upon the lower coating layer and contains a binder and inorganic particles dispersed in the binder, wherein a portion of the inorganic particles are ferromagnetic particles,
   wherein at least 50% by weight portion of the non-magnetic inorganic particles, which are contained in the lower coating layer, is constituted of granular inorganic particles, which have a mean particle diameter of at most 0.08 $\mu$m, or acicular inorganic particles, which have a mean longer axis length falling within the range of 0.05 $\mu$m to 0.3 $\mu$m and an acicular ratio falling within the range of 3 to 20,
   wherein the cleaning medium is for cleaning a magnetic head of magnetic recording devices,
   wherein the cleaning medium is such that a rate of head wear of a magnetic head cleaned with the cleaning medium is equal to or greater than 0.1 $\mu$m/10 min and less than 0.5 $\mu$m/10 min, and
   wherein the non-magnetic inorganic particles, which are contained in the lower coating layer, are constituted of at least a single kind of particle selected from the group consisting of titanium oxide particles, $\alpha$-iron oxide particles, barium sulfate particles, zinc oxide particles, and alumina particles.

2. A cleaning medium as defined in claim 1 wherein the lower coating layer and the cleaning layer are formed with a wet-on-wet coating technique, in which, after the lower coating layer has been coated on the substrate, the cleaning layer is coated on the lower coating layer while the lower coating layer is in a wet state.

3. A cleaning medium for magnetic recording devices as defined in claim 1 wherein the thickness of the cleaning layer falls within the range of 0.05 $\mu$m to 1.0 $\mu$m.

4. A cleaning medium for magnetic recording devices as defined in claim 1 wherein the thickness of the entire cleaning medium falls within the range of 4 $\mu$m to 15 $\mu$m.

5. A cleaning medium for magnetic recording devices as defined in claim 1 wherein the coercive force Hc of the cleaning layer falls within the range of 500 Oe to 3,000 Oe.

6. A cleaning medium for magnetic recording devices as defined in claim 1 wherein the lower coating layer contains carbon black having a primary particle diameter falling within the range of 10 nm to 80 nm.

7. A cleaning medium for magnetic recording devices as defined in claim 1 wherein the acicular ratio of the ferromagnetic particles contained in the cleaning layer falls within the range of 4 to 18.

8. A cleaning medium for magnetic recording devices as defined in claim 1 wherein the value of saturation magnetization $\sigma$ of the ferromagnetic particles contained in the cleaning layer falls within the range of 100 emu/g to 180 emu/g.

* * * * *